United States Patent
Hsieh

(10) Patent No.: US 9,587,422 B2
(45) Date of Patent: Mar. 7, 2017

(54) DIRECTION SWITCHABLE RATCHET DEVICE FOR DOOR OPERATOR

(71) Applicant: Chung-Hsien Hsieh, New Taipei (TW)

(72) Inventor: Chung-Hsien Hsieh, New Taipei (TW)

(\*) Notice: Subject to any disclaimer, the term of this patent is extended or adjusted under 35 U.S.C. 154(b) by 0 days.

(21) Appl. No.: 14/797,152

(22) Filed: Jul. 12, 2015

(65) Prior Publication Data

US 2016/0024835 A1 Jan. 28, 2016

(30) Foreign Application Priority Data

Jul. 22, 2014 (TW) .............................. 103125094 A

(51) Int. Cl.
*H02P 3/06* (2006.01)
*E05F 15/668* (2015.01)
*E05F 3/16* (2006.01)

(52) U.S. Cl.
CPC .............. *E05F 15/668* (2015.01); *E05F 3/16* (2013.01); *H02P 3/06* (2013.01); *E05Y 2201/21* (2013.01); *E05Y 2201/214* (2013.01); *E05Y 2201/244* (2013.01); *E05Y 2201/462* (2013.01); *E05Y 2201/68* (2013.01); *E05Y 2800/409* (2013.01)

(58) Field of Classification Search
CPC .............. E05F 15/668; E05F 3/16; H02P 3/06
See application file for complete search history.

(56) References Cited

U.S. PATENT DOCUMENTS 4,850,418 A 7/1989 Bresson ..................... 160/310
5,447,477 A 9/1995 Bresson ..................... 475/154
6,055,885 A 5/2000 Shea ............................ 74/625
(Continued)

FOREIGN PATENT DOCUMENTS

AG 201408860 A 3/2014
CN 201883918 U 6/2011
(Continued)

OTHER PUBLICATIONS

Office Action 103125094, Oct. 7, 2015.
Search Report 103125094, Oct. 7, 2015.
Office Action 201510145926.4, Aug. 30, 2016.

*Primary Examiner* — Shawki S Ismail
*Assistant Examiner* — Muhammad S Islam
(74) *Attorney, Agent, or Firm* — Bui Garcia-Zamor; Jessica H. Bui, Esq.

(57) ABSTRACT

A direction switchable ratchet device for a door operator is provided. The door operator includes an electric motor, an electromagnetic brake and the direction switchable ratchet device. The direction switchable ratchet device comprises a first and second direction restricting devices and a manually operable mechanism. A drive shaft of the electric motor is braked by a brake baffle disk when the electric motor is electrically de-energized and is released when the electric motor is electrically energized. The first and second direction restricting devices are provided to prevent the drive shaft from being rotated clockwise and counter-clockwise respectively by holding the brake baffle disk. In the event of power failure, the manually operable mechanism is effective to open the door once a pawl of the direction restricting device at the free side is retracted. The manually operable mechanism of the door operator is prevented from being incorrectly mounted in a cost-effective manner.

9 Claims, 4 Drawing Sheets

(56) References Cited

U.S. PATENT DOCUMENTS

| | | | | |
|---|---|---|---|---|
| 6,092,582 | A * | 7/2000 | Liu | E06B 9/70 |
| | | | | 160/188 |
| 6,118,243 | A * | 9/2000 | Reed | E05F 15/41 |
| | | | | 318/282 |
| 7,055,283 | B2 * | 6/2006 | Hsieh | E05F 15/40 |
| | | | | 160/188 |
| 8,070,228 | B2 * | 12/2011 | Karremans | B60N 2/2821 |
| | | | | 297/256.16 |
| 2008/0197792 | A1 * | 8/2008 | Hsieh | E06B 9/82 |
| | | | | 318/10 |
| 2009/0151262 | A1 * | 6/2009 | Scheib | E06B 9/70 |
| | | | | 49/349 |
| 2013/0048440 | A1 * | 2/2013 | Hsieh | F16D 59/02 |
| | | | | 188/68 |

FOREIGN PATENT DOCUMENTS

| | | |
|---|---|---|
| EP | 0285528 B1 | 4/1991 |
| TW | 201408860 A | 3/2014 |
| TW | 481285 | 7/2014 |

\* cited by examiner

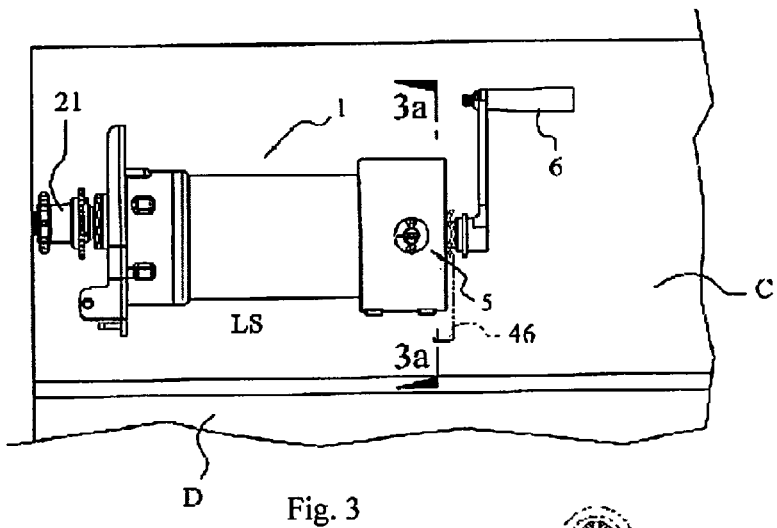
Fig. 3
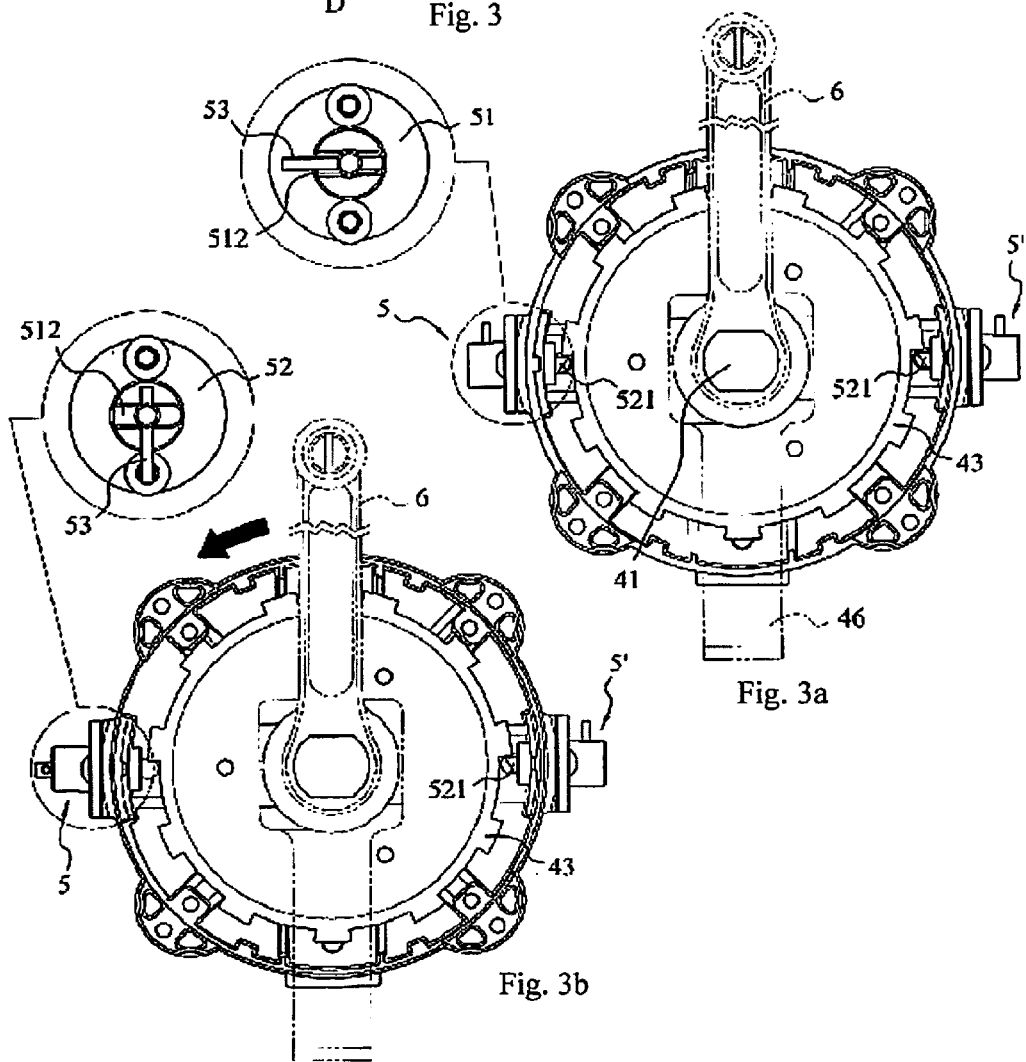
Fig. 3a
Fig. 3b

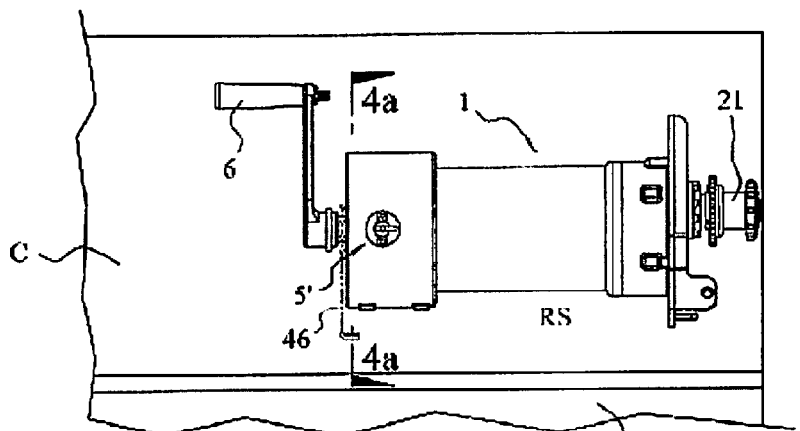
Fig. 4
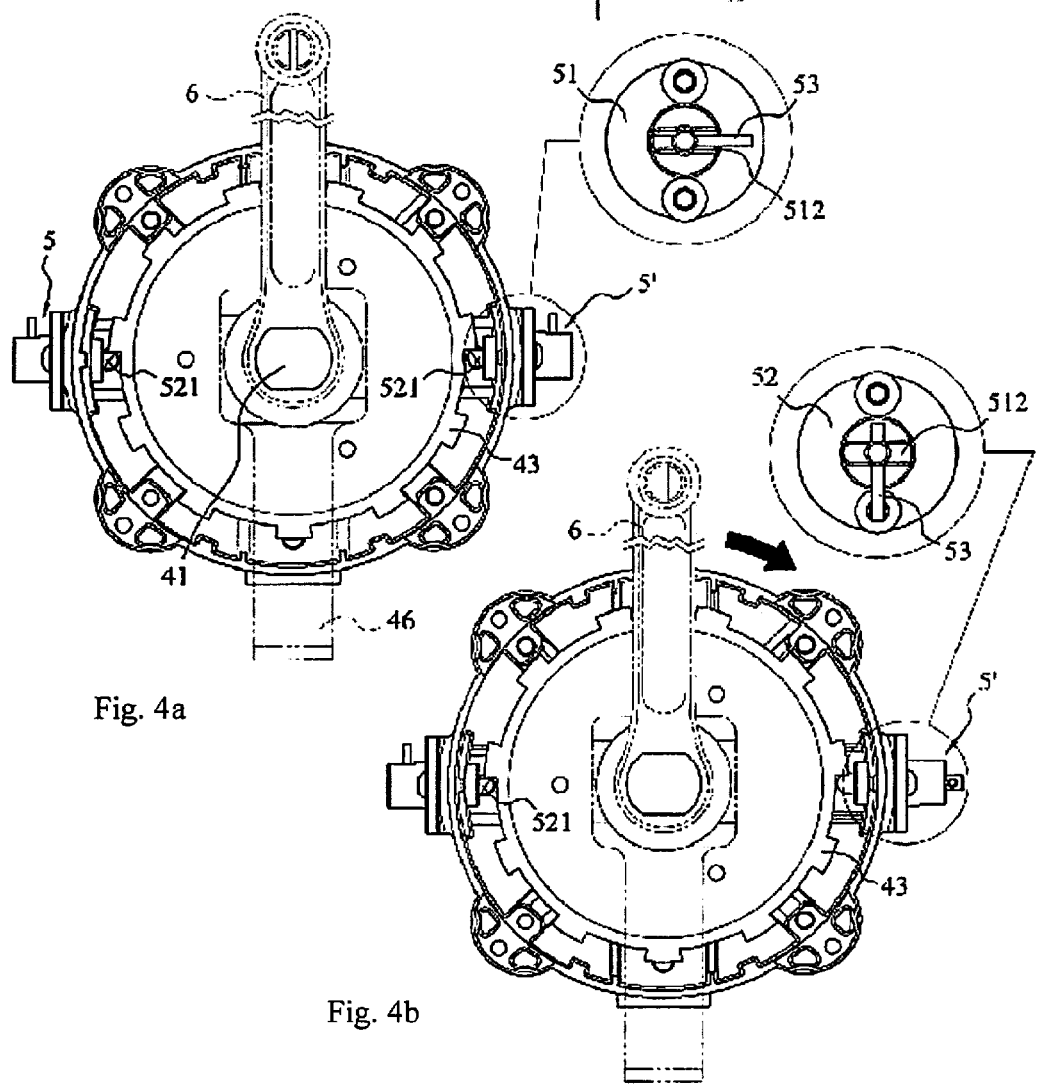
Fig. 4a
Fig. 4b

DIRECTION SWITCHABLE RATCHET DEVICE FOR DOOR OPERATOR

BACKGROUND OF THE INVENTION

Field of the Invention

This invention relates to a direction switchable ratchet device for a door operator which is capable of preventing a hand-operated mechanism of the door operator from being incorrectly mounted.

Brief Description of Prior Art

A general door operator that is provided to upward or downward move a movable barrier is powered by electricity. In the case of power failure, power interruption due to fire or malfunction of the door operator, shutting or opening the door may be difficult. In order to ensure that the door can be shut or opened in the case of power failure, power interruption or malfunction of the door operator, the door operator is normally provided with a hand-operated mechanism. For example, a transmission mechanism is provided to upward or downward move the movable barrier manually by pulling a pull chain.

Such a door operator further comprises an electromagnetic brake for holding the movable barrier at a desired position or a stationary position. Conventionally, the electromagnetic brake may be so configured that a brake disk normally biased by a spring is retracted away from a brake lining by an electromagnet so as to release a rotary shaft of the door operator in the course of upward or downward moving the movable barrier by electrically energizing an electric motor of the door operator and that the brake disk is biased by the spring and abutted against the brake lining so as to brake the rotary shaft of the door operator in the course of electrically de-energizing the electric motor and the electromagnet of the door operator.

U.S. Pat. No. 6,055,885 issued to the inventor discloses a pull chain disk of a hand-operated mechanism. The pull chain disk also serves as a brake mechanism. In the course of upward or downward moving the movable barrier by electrically energizing the electric motor of the door operator, the pull chain disk is retracted by the electromagnet so as to release the drive shaft. When the electric motor is electrically de-energized, the pull chain disk is biased by the spring and abutted against a brake disk, and a chain of the pull chain disk is pressed on the housing of the door operator by a pressing plate so that the rotary shaft of the door operator is braked. In the case of power failure, the movable barrier may be moved by simply pulling the chain without additional operation on the brake mechanism.

U.S. Pat. No. 6,092,582 discloses that in a manual mode, the rotary shaft of the door operator can be rotated manually by actuating a brake release lever and pulling a chain simultaneously after a safety lever is switched to an unlocked position.

A pull chain disk mechanism for manual operation will be used only in the case of power failure or power interruption, and thus it is rarely used and sometimes is only reserved for a critical situation. It may be inconvenient to hide the suspending chain of the pull chain disk mechanism. As a result, the door operator may have an unpleasant outlook and may be touched by a child intentionally or unintentionally. It is thus desirable to provide a mechanism for manually moving the movable barrier in the case of power failure or failure of the door operator, which is easy to operate, simple in structure, and cost-effective.

SUMMARY OF THE INVENTION

A main object of the present invention is to provide a direction switchable ratchet device for a door operator, which is capable of preventing a hand-operated mechanism of the door operator from being incorrectly mounted. The present invention includes a pair of direction restricting devices which are mounted on two opposite sides of the housing of the door operator and which allow the door operator to be mounted at either orientation. The hand-operated mechanism can be prevented from being incorrectly mounted without additional adjustment.

Another object of the present invention is to provide a direction switchable ratchet device for a door operator which can be properly operated by unlocking or disabling the direction restricting device arranged at the free side after the door operator is mounted.

A further object of the present invention is to provide a direction switchable ratchet device for a door operator which allows a door to be opened by actuating the hand-operated mechanism in the case of power failure, without having to make any other operations or switches.

In order to achieve the above and other objects, a direction switchable ratchet device for a door operator according to the present invention is provided. The door operator comprises: a speed reducer having an output shaft; an electric motor having a drive shaft with one end coupled to the output shaft and the other end provided with a brake disk; an electromagnetic brake comprising a rotary shaft, a brake baffle disk, an elastic member, an electromagnet and a seat; a control circuit, electrically connected to both of the electric motor and the electromagnet; and a handle; wherein the brake baffle disk is attached to one end of the rotary shaft in such a manner that the brake baffle disk is axially movable with respect to the rotary shaft; the elastic member is disposed on the rotary shaft to bias the brake baffle disk and abut the brake baffle disk against the brake disk of the drive shaft of the electric motor; the electromagnet is mounted within the seat for retracting the brake baffle disk; the seat is secured to a housing and provided with a central bore through which the rotary shaft passes; and a control circuit is electrically connected to both of the electric motor and the electromagnet; and the handle is attached to the other end of the rotary shaft. The direction switchable ratchet device comprises: a first direction restricting device and a second direction restricting device disposed opposite to each other on the housing of the door operator and a plurality of ratchet teeth formed on a circumference of the brake baffle disk; wherein each of the first and second direction restricting devices comprises a base seat and a sliding pin, the base seat is attached to the housing and provided with a sleeve having a through hole for receiving one end of the sliding pin; the other end of the sliding pin comprises a pawl that is adapted to be engaged with at least one of the plurality of ratchet teeth formed on the brake baffle disk.

The door operator can be mounted with respect to a winding shaft casing in a first mounting orientation or a second mounting orientation inverse to the first mounting orientation. When the door operator is mounted in the first mounting orientation, the side of the door operator proximal to the winding shaft casing is defined as the restricted side, and the side of the door operator distal to the winding shaft casing is defined as the free side. When the door operator is mounted in the second mounting orientation, the side of the door operator proximal to the winding shaft casing is defined as the restricted side, and the side of the door operator distal to the winding shaft casing is defined as the free side.

Further, each of the first direction restricting device and second direction to restricting device has a retaining pin that is arranged to extend transversely through the end of the sliding pin and an elastic member that is arranged at the outer periphery of the retaining pin between the retaining pin and the pawl for biasing the pawl. A recess is provided on the top face of the base seat. When the retaining pin is accommodated in the recess, the pawl extends out of the through hole of the base seat. At the end portion of the pawl, a slope is provided to facilitate sliding of the pawl over the ratchet teeth of the brake baffle disk in a single direction. When the spring pin is held on the top face of the base seat, the pawl is retracted into the through hole and hence is disengaged with the brake baffle disk.

Preferably, the first direction restricting device is arranged at the free side associated with the first mounting orientation, and the second direction restricting device is arranged at the free side associated with the second mounting orientation.

Preferably, a brake release lever is provided. The brake release lever is provided with a corrugated portion at one end and a free portion at the other end. The corrugated portion has a shaft hole, and the brake release lever is fitted on the rotary shaft in such a manner that the brake release level is interposed between the seat and the handle with the rotary shaft passing through the shaft hole. In the event of power failure, a user may manually retract the brake baffle disk by operating the free portion of the brake release lever so as to release the brake. As a result, a movable barrier is urged to shut the door due to, for example, its own weight.

Accordingly, the door operator can be mounted in either orientation without additional adjustment. The direction restricting device at the free side can be unlocked or disabled after the door operator is mounted. Then, in the event of power failure, the door can be opened by operating the hand-operated mechanism. As such, the hand-operated mechanism of the door operator is prevented from being incorrectly mounted in a cost-effective manner.

BRIEF DESCRIPTION OF THE DRAWINGS

The above and other objects, features and advantages of the present invention will become apparent with regard to the following descriptions, appended claims and accompanying drawings, in which:

FIG. 3 is a schematic side view showing the door operator mounted in a first mounting orientation;

FIG. 3a is a sectional schematic view taken along line 3a-3a of FIG. 3, showing that the brake baffle disk is prevented from rotation in both directions;

FIG. 3b is a sectional schematic view showing that the first direction restricting device installed at the free side when the door operator is mounted in the first mounting orientation is unlocked or disabled;

FIG. 4 is a schematic side view showing the door operator mounted in a second mounting orientation;

FIG. 4a is a sectional schematic view taken along line 4a-4a of FIG. 4, showing that the brake baffle disk is prevented from rotation in the one direction and in the inverse direction; and FIG. 4b is a sectional schematic view showing that the second direction restricting device installed at the free side when the door operator is mounted in the second mounting orientation is unlocked or disabled.

DETAILED DESCRIPTION OF PREFERRED EMBODIMENTS

Figure 1:
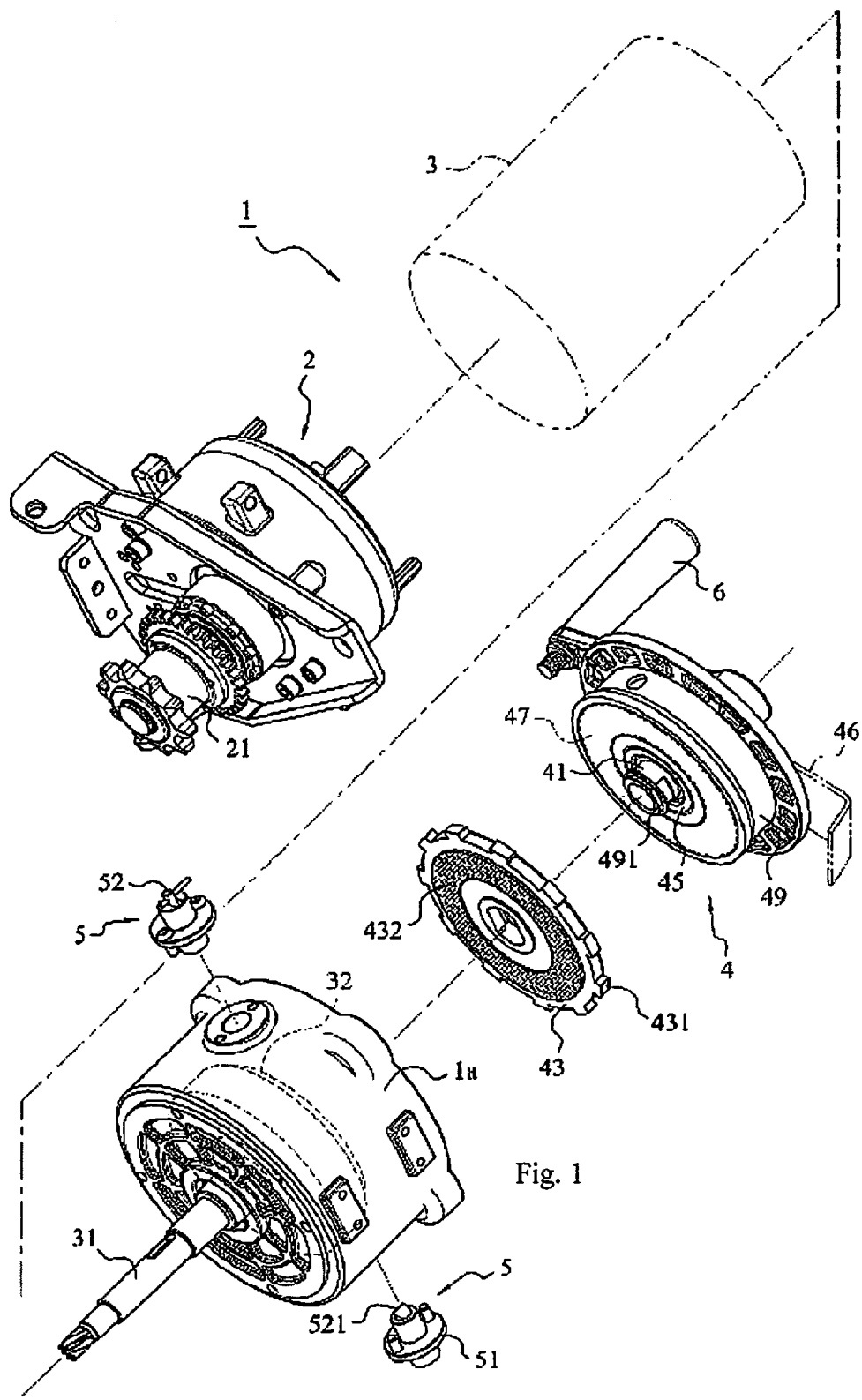
FIG. 1 is an exploded perspective view showing the direction switchable ratchet device for a door operator according to the present invention.
Figure 2A:
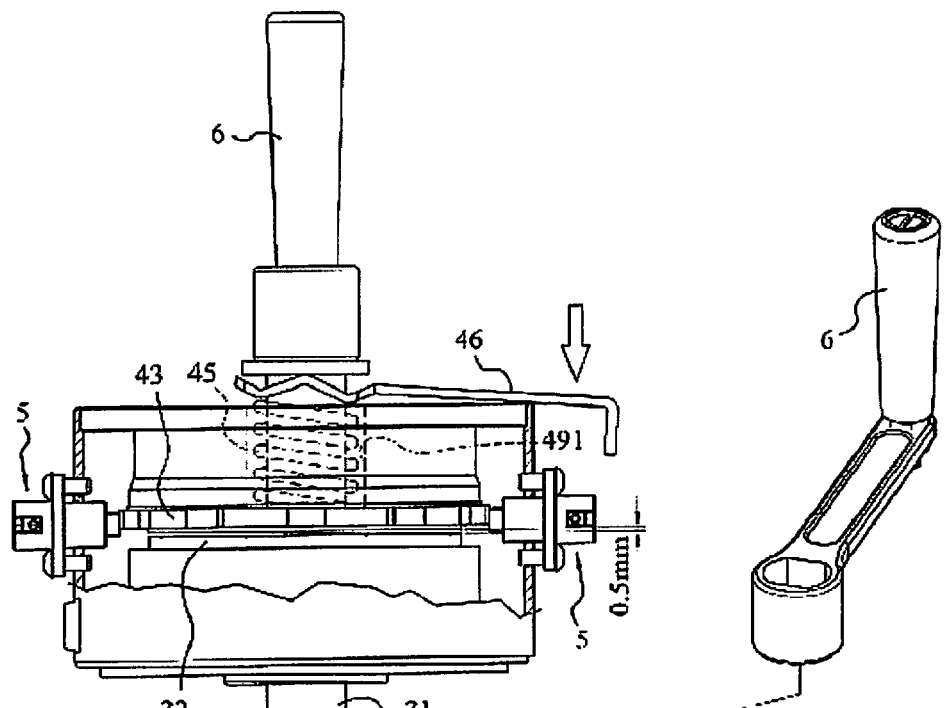
FIG. 2a is a partially sectional schematic view showing the electromagnetic brake.
Figure 2:
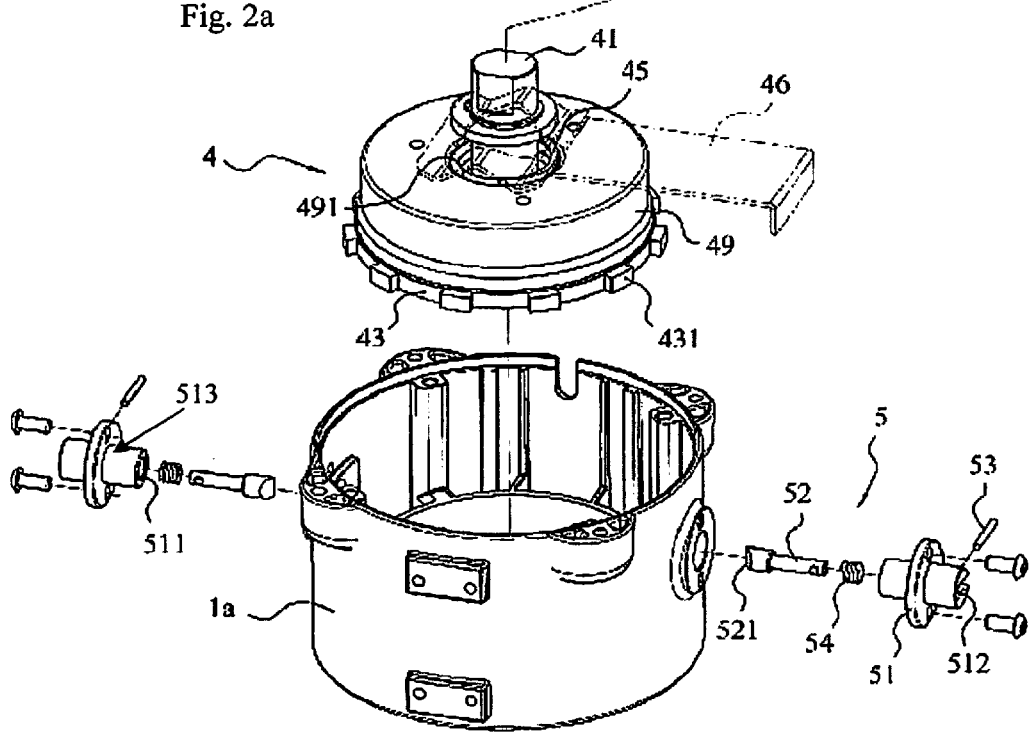
FIG. 2 is an exploded perspective view showing the electromagnetic brake having the direction switchable ratchet device according to the present invention, in which neighboring other components are not shown.

Referring to FIGS. 1, 2 and 2a, there is illustrated a preferred embodiment of the direction switchable ratchet device for a door operator of the present invention. The door operator 1 mainly comprise: a speed reducer 2, an electric motor 3 and an electromagnetic brake 4. The electric motor 3 includes a drive shaft 31. The drive shaft 31 is coupled to the speed reducer 2 at one end and provided with a brake disk 32 at the other end. The speed reducer 2 provides speed reduction from the drive shaft 31 to an output shaft 21 which is normally coupled to a winding shaft in a winding shaft casing (not shown) through a plurality of gears so as to convert the rotation speed of the drive shaft 31 to a reduced rotation speed suitable for upward or downward movement of a movable barrier. The electromagnetic brake 4 is disposed on the circumference of the rotary shaft 41 and is connected to the other end of the electric motor 3 at the side where the brake disk 32 is provided.

The electromagnetic brake 4 comprises a rotary shaft 41, a brake baffle disk 43, an elastic member 45, an electromagnet 47 and a seat 49. The brake baffle disk 43 is attached to one end of the rotary shaft 41 in such a manner that the brake baffle disk 43 is axially movable with respect to the rotary shaft 41. The brake baffle disk 43 has an end face on which a brake lining 432 facing the brake disk 32 is disposed, and a plurality of ratchet teeth 431 are formed on the circumference of the brake baffle disk 43. The elastic member 45 is disposed on the rotary shaft 41 to bias the brake baffle disk 43 and abut the brake baffle disk 43 against the brake disk 32 so as to brake the drive shaft 31 of the electric motor 3 when the electric motor 3 is electrically de-energized. The electromagnet 47 is accommodated within the seat 49 and functions to retract the brake baffle disk 43 so as to release the drive shaft 31 when the electric motor 3 is electrically energized. The seat 49 is secured to a housing 1a and provided with a central bore 491 through which the rotary shaft 41 passes.

At least a direction restricting device 5 is provided. The direction restricting device 5 comprises a base seat 51, a sliding pin 52. The base seat 51 is attached to the housing 1a and comprises a sleeve 513 extending into the interior of the housing 1a. The sleeve 513 has a through hole 511 which is adapted to receive one end of the sliding pin 52. The other end of the sliding pin 52 is provided with a pawl 521 that is configured to be engaged with at least one of the ratchet teeth 431 of the brake baffle disk 43 so as to prevent the brake baffle disk 43 from being rotated in one direction. A control circuit is electrically connected to both of the electric motor 3 and the electromagnet 47. A handle 6 is attached to another end of the rotary shaft 41. It is further provided a brake release lever 46 that is provided with a corrugated portion on one end and a free portion on the other end. The corrugated portion is formed with a shaft hole, and the brake release lever is fitted on the rotary shaft 41 in such a manner that the brake release lever is interposed between the seat 49 and the handle 6.

In a normal operation mode, the control circuit is configured to electrically energize the electromagnet 47 so as to retract the brake baffle disk 43 away from the brake disk 32 and hence release the drive shaft 31 while the electric motor 3 is electrically energized and to electrically de-energize the electromagnet 47 such that the brake baffle disk 43 is biased by the elastic member 45 and abutted against the brake disk 32 so as to brake the drive shaft 31 with the frictional force of brake lining 432 while the electric motor 3 is electrically de-energized. In the event of power failure, in order to shut the door, the user can manually retract the brake baffle disk 43 by operating the free portion of the brake release lever 46 such that the brake is thus released and the movable barrier falls down by its own weight; and in order to open the door, the user can rotate the brake baffle disk 43 by means of the handle 6 to drive the drive shaft 31 that is coupled to the winding shaft so as to raise the movable barrier.

Usually, a door operator of the known kind is not restricted to be mounted in a particular orientation. The direction or orientation, in which the door operator is mounted is normally dependent on the conditions such as the position or location where the movable barrier is to be installed. For example, the door operator may be mounted in place in parallel with the winding shaft at the left or right side of the winding shaft casing. However, in light of the fact that rotation of the brake baffle disk in one direction is prevented by a direction restricting device, the direction restricting device has to be installed in accordance with the orientation of the door operator in such a manner that rotation in the intended direction is correctly prevented. If the direction restricting device is not properly arranged, then the door operator may be unable to be braked, and the hand-operated mechanism may be unable to be operated as desired.

With reference to FIGS. 3 to 3b and 4 to 4b, a first direction restricting device 5 and a second direction restricting device 5' are shown. The direction restricting devices 5, 5' are arranged opposite to each other radially and attached to the housing 1a of the door operator 1. The door operator 1 can be mounted with respect to the winding shaft casing C in a first mounting orientation LS (i.e. the door operator 1 is so oriented that the speed reducer 2 is on the left side of the electric motor 3 as shown in FIG. 3) or a second mounting orientation RS (i.e. the door operator 1 is so oriented that the speed reducer 2 is on the right side of the electric motor 3 as shown FIG. 4). In the case that the door operator 1 is mounted in the first mounting orientation LS, the side of the door operator 1 which is proximal to the winding shaft casing C and which is hidden behind the door operator and unaccessible by a user is defined as the restricted side, and the side of the door operator 1 which is distal to the winding shaft casing C and which is exposed and accessible by a user is the free side. In the case that the door operator is mounted in the second mounting position RS, the side of the door operator 1 which is proximal to the winding shaft casing C and which is hidden behind the door operator and unaccessible by a user is defined as the restricted side, and the side which is distal to the winding shaft casing C and which is exposed and accessible by a user is defined as the free side.

The first direction restricting device 5 is arranged at the free side associated with the first mounting orientation LS. The second direction restricting device 5' is arranged at the free side associated with the second mounting orientation RS. Each of the direction restricting devices 5 and 5' further comprises a retaining pin 53 that is arranged to extend transversely through the end of the sliding pin 52 and an elastic member 54 that is arranged at the outer periphery of the sliding pin 52 between the retaining pin 53 and the pawl 521 so that the pawl 521 is elastically biased.

A recess 512 is provided on the top face of the base seat 51 for receiving the retaining pin 53. When the retaining pin 53 is accommodated in the recess 512, the pawl 521 extends out of the through hole 511 of the sleeve 513 into the interior of the housing 1a. The pawl 521 has a slope that may facilitate sliding of the pawl over the ratchet teeth of the brake baffle disk 43 in a single direction. When the retaining pin 53 is held on the top face of the base seat 51, the pawl 521 is retracted within the through hole 511 so that the pawl 521 is disengaged with the brake baffle disk 43 (i.e. prevention of rotation of the brake baffle disk in one direction is cancelled or disabled).

In an initial state of the door operator 1, the pawl 521 of the direction restricting devices 5' is engaged with the brake baffle disk 43 so that the brake baffle disk 43 is prevented from being rotated in one direction, for example clockwise direction, while the pawl 521 of the direction restricting device 5 is engaged with the brake baffle disk 43 so that the brake baffle disk 43 is prevented from being rotated in an inverse direction, for example counter-clockwise direction. As such, rotation of the brake baffle disk in both directions is prevented (as shown in FIGS. 3a and 4a). Owing to such arrangement, the door operator 1 can be mounted in either orientation without additional adjustment. After the door operator 1 has been mounted, it will function properly once the direction restricting device 5 or 5', as the case may be, at the free side is unlocked or disabled.

In short, with reference to FIG. 3b, in the case that the door operator is mounted in the first mounting orientation LS, if the direction restricting device 5 at the free side is unlocked or disabled, the brake baffle disk 43 may be rotated upon power failure by operating the handle 6, which in turn actuates the rotation of the output shaft 31 of the door operator 1 to open the door. With reference to FIG. 4b, in the case that the door operator is mounted in the second mounting orientation RS, if the direction restricting device 5' at the free side is unlocked or disabled, the brake baffle disk 43 may be rotated upon power failure by operating the handle 6, which in turn actuates the rotation of the output shaft 31 of the door operator 1 to open the door. As such, the hand-operated mechanism of the door operator is prevented from being incorrectly mounted in a cost-effective way.

While the preferred embodiments have been described as above, it is noted that the preferred embodiments are not intended to restrict the scope of implementation of the present invention. Modifications and variations can be made without departing from the spirit and scope of the claims of the present invention.

What is claimed is:

1. A direction switchable ratchet device for a door operator, said door operator comprising:
   a speed reduction mechanism having an output shaft;
   an electric motor having a drive shaft of which one end is coupled to said output shaft, and the other end is provided with a brake disk;
   an electromagnetic brake comprising a rotary shaft, a brake baffle disk, an elastic member, an electromagnet and a seat, said, wherein said brake baffle disk is attached on one end of said rotary shaft in such a manner that said brake baffle disk is axially movable with respect to said rotary shaft, said elastic member is disposed on said rotary shaft to bias said brake baffle disk and abut said brake baffle disk against said brake disk of said drive shaft, said electromagnet is mounted within said seat for retracting said brake baffle disk, and said seat is secured to a housing and provided with a central bore through which the other end of said rotary shaft passes; and
   a control circuit electrically connected to both of said electric motor and said electromagnet;

said direction switchable ratchet device comprising:
a first direction restricting device and a second direction restricting device disposed on said housing of said door operator opposite to each other; and a plurality of ratchet teeth formed on a circumference of said brake baffle disk,
wherein each of said first and second direction restricting devices comprises a base seat and a sliding pin, said base seat being attached to said housing and provided with a sleeve having a through hole, one end of said sliding pin being received in the through hole and the other end of said sliding pin comprising a pawl that is adapted to be engaged with at least one of said plurality of ratchet teeth formed on said brake baffle disk.

2. The device of claim 1, wherein said door operator is mountable with respect to a winding shaft casing in a first mounting orientation or a second mounting orientation, and when said door operator is mounted in one of said first mounting orientation and said second mounting orientation, said door operator has a restricted side that is proximal to said winding shaft casing and a free side that is distal to said winding shaft casing.

3. The device of claim 2, wherein said first direction restricting device is arranged at said free side associated with said first mounting orientation, and said second direction restricting device is arranged at said free side associated with said second mounting orientation.

4. The device of claim 1, further comprising a handle connected to the other end of said rotary shaft.

5. The device of claim 1, further comprising a brake release lever having a corrugated portion at one end and an operated portion at the other end, wherein said corrugated portion is formed with a shaft hole, and said brake release lever is fitted on the rotary shaft in such a manner that said brake release lever is interposed between said seat and said handle with the rotary shaft passing through the shaft hole.

6. The device of claim 1, wherein each of said first and second direction restricting devices comprises a retaining pin adapted to extend transversely through one end of said sliding pin and an elastic member disposed at the outer periphery of said sliding pin between said retaining pin and said pawl, to bias said pawl.

7. The device of claim 6, wherein said base seat having a recess on a top face thereof for receiving said retaining pin, when said retaining pin is accommodated in said recess, with said pawl extending out of said through hole of said sleeve, said pawl having a slope adapted to facilitate sliding of the pawl over said ratchet teeth of said brake baffle disk in a single direction, and when said retaining pin is held on said top face of said base seat, said pawl is retracted and positioned within said through hole of said sleeve so that the pawl is disengaged with said ratchet teeth of said brake baffle disk.

8. The device of claim 7, wherein said door operator is mounted in said first mounting orientation, when said first direction restricting device arranged at said free side is unlocked, so that said handle is operable to rotate said brake baffle disk so as to rotate said output shaft of said door operator.

9. The device of claim 7, wherein said door operator is mounted in said first mounting orientation, when said second direction restricting device arranged at said free side is unlocked, so that said handle is operable to rotate said brake baffle disk so as to rotate said output shaft of said door operator.

* * * * *